(12) United States Patent
Spiller

(10) Patent No.: US 6,647,928 B1
(45) Date of Patent: Nov. 18, 2003

(54) ADJUSTABLE HARNESS AND ANIMAL BIRTH CONTROL DEVICE

(76) Inventor: Karmicheal Spiller, 3730 Hancock St., Jackson, MS (US) 39213

( * ) Notice: Subject to any disclaimer, the term of this patent is extended or adjusted under 35 U.S.C. 154(b) by 0 days.

(21) Appl. No.: 09/716,341

(22) Filed: Nov. 21, 2000

(51) Int. Cl.[7] .............................................. A01K 21/00
(52) U.S. Cl. ...................................... 119/854; 119/863
(58) Field of Search ................................ 119/854, 792, 119/863, 868; 24/171

(56) References Cited

U.S. PATENT DOCUMENTS

| | | | | |
|---|---|---|---|---|
| 1,614,083 A | * | 1/1927 | Plantico ...................... | 119/793 |
| 2,141,970 A | * | 12/1938 | Buckingham ............... | 119/854 |
| 2,190,115 A | * | 2/1940 | Fuqua ......................... | 119/854 |
| 2,825,330 A | * | 3/1958 | Storz ........................... | 119/854 |
| 2,974,635 A | * | 3/1961 | McDowell .................. | 119/854 |
| 3,107,653 A | * | 10/1963 | Goddard, Jr. ............... | 119/854 |
| 3,176,657 A | * | 4/1965 | Callaway .................... | 119/854 |
| 4,133,297 A | * | 1/1979 | Denebeim .................... | 119/854 |
| 4,709,661 A | * | 12/1987 | Mayle, Jr. ................... | 119/868 |
| 4,712,280 A | * | 12/1987 | Fildan ......................... | 24/171 |
| 5,676,426 A | * | 10/1997 | Herring ....................... | 119/770 |
| 5,896,831 A | * | 4/1999 | Alpert ......................... | 119/792 |
| 5,947,062 A | * | 9/1999 | Hoffman et al. ............ | 119/769 |
| 6,029,273 A | * | 2/2000 | McCrane ..................... | 2/16 |
| 6,167,844 B1 | * | 1/2001 | Cantrell et al. ............. | 119/792 |
| 6,192,835 B1 | * | 2/2001 | Calhoun et al. ............. | 119/792 |

* cited by examiner

Primary Examiner—Charles T. Jordan
Assistant Examiner—Tara M Golba
(74) Attorney, Agent, or Firm—Peter A. Borsari

(57) ABSTRACT

An adjustable harness and animal birth control device for female quadrupeds comprising an adjustable harness having an adjustable waist collar, an adjustable left harness strap, an adjustable central harness strap and an adjustable right harness strap, each of the harness straps being detachably secured to the waist collar, and a birth control device which is detachably secured to the adjustable harness. The adjustable harness utilizes hook and loop fastening means in order to provide proper fitting and adjustment for various sizes of quadrupeds.

24 Claims, 7 Drawing Sheets

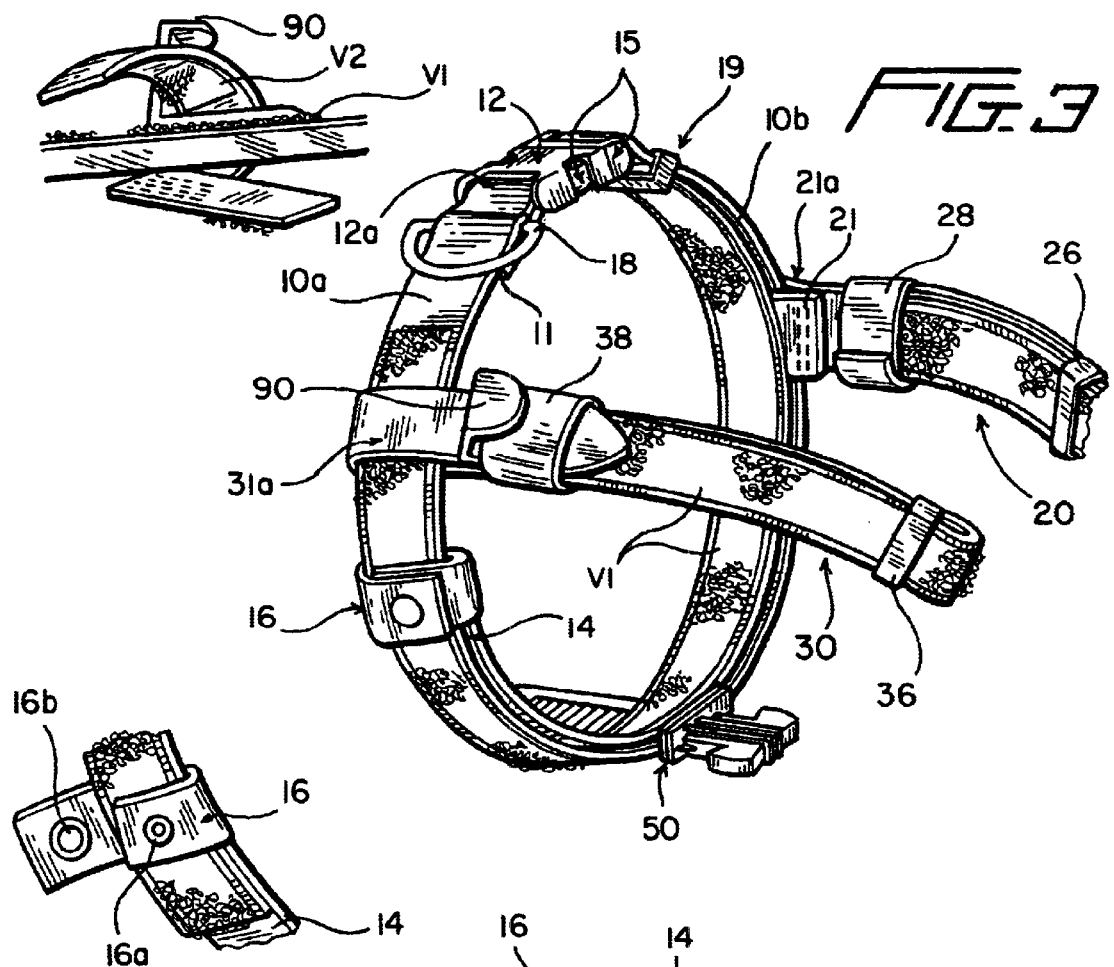
FIG. 3
FIG. 3A
FIG. 3B
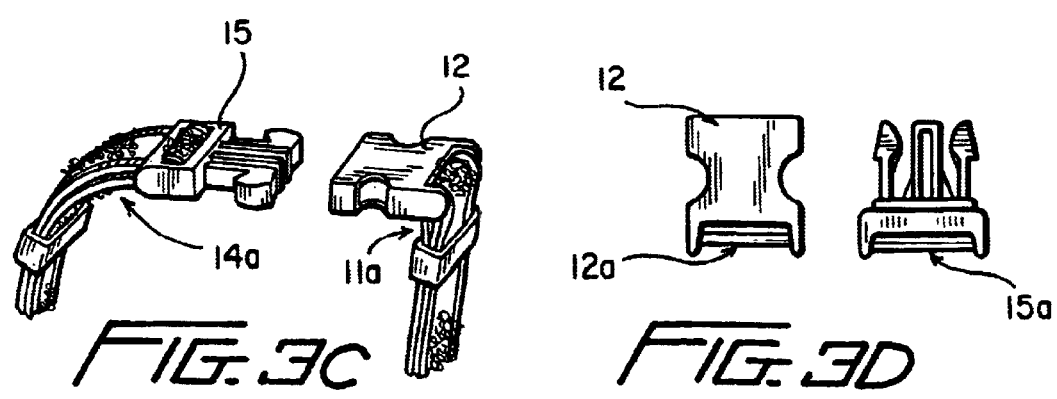
FIG. 3C
FIG. 3D

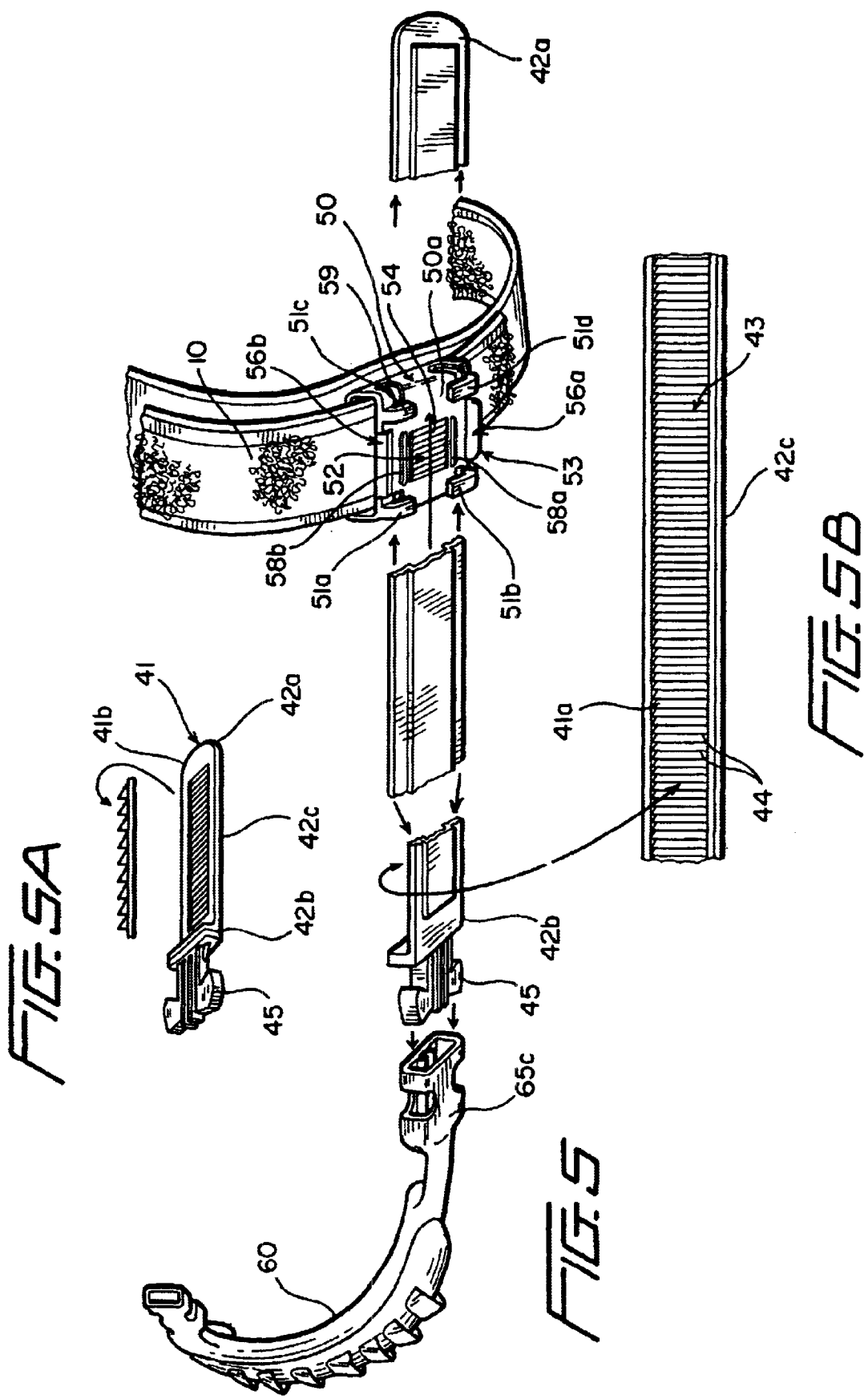

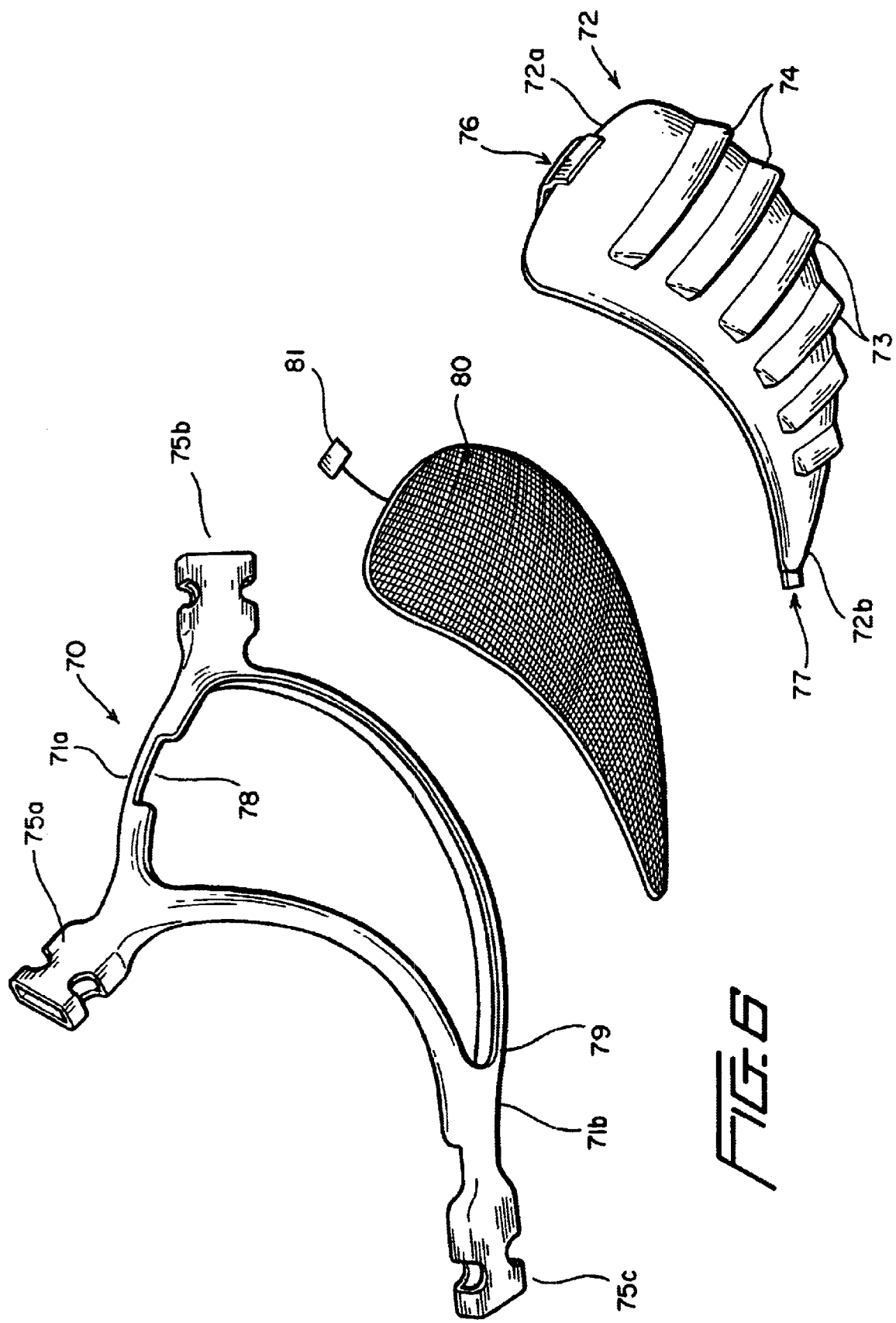

ADJUSTABLE HARNESS AND ANIMAL BIRTH CONTROL DEVICE

FIELD OF INVENTION

The present invention relates to an adjustable harness and animal birth control device. More particularly, the present invention provides an adjustable harness suitable for use with domestic quadrupeds, such as dogs, cats and the like, which can be used alone or in combination with an animal birth control device. The adjustable harness utilizes hook and loop fastening means, such as Velcro™, as the primary adjusting means. The adjustable harness includes coupling means such that the inventive birth control device can be detachably secured to the harness, thereby providing a simple and beneficial means for preventing unwanted impregnation of quadrupeds without the obvious risks of surgery and permanent sterilization.

BACKGROUND OF THE INVENTION

Current studies estimate that there are approximately a hundred million domestic pets in the United States which are owned and cared for by responsible pet owners. However, the unwanted domestic animal population continues to grow at an alarming rate. Of the more than twenty-seven million domestic animals born each year in the United States, countless millions are unwanted and abandoned. This tragic number of homeless animals suffer horrible cruelties associated with abandonment, including sickness, exposure, starvation and death on the streets of the nation's cities and towns, and in the fields and forests of the countryside. In addition, these abandoned animals can carry numerous diseases which can be transmitted to domestic pets, as well as zoonosis diseases, which can be transmitted from animal to human.

There are a number of ways in which the unwanted pet population is controlled today. The most tragic solution is euthanasia, which is the single largest cause of death for dogs and cats in the United States. Five to ten million unwanted pets end up in animal shelters in the United States each year. These "five to ten million" animals are classified as surplus and exterminated because they are unwanted or abandoned. This "solution" to addressing the unwanted and abandoned pet population costs more than one billion dollars annually. This number does not include the hundreds of thousands of the abandoned, severely neglected or abused animals that never make it to the pounds or shelters to be counted and killed.

Another "solution" in controlling the unwanted pet population is pet sterilization, i.e. spaying and neutering. Although spaying and neutering are the most common ways of preventing unwanted births by pets, many pet owners do not choose this option for several reasons. First, spaying or neutering is irreversible and permanent. As a result, many owners who wish to breed their pet at a selected time or desire to reserve the option of breeding, do not have their pets sterilized. Second, such surgery is not performed because of the perceived high cost associated with spaying or neutering. Third, many pet owners choose not to spay or neuter their pets because of the possible risks of surgery or the perceived alteration of the animal's psyche. Finally, some pet owners are simply irresponsible. Owners of female pets often believe that they can control their pet while it is in heat and that it won't come into contact with a male during the gestation cycle. Owners of male domestics may not care whether their pet mates with a female since such a pet owner will not have to deal with the unwanted pregnancy. In any event, although spaying and neutering provides a humane and safe way to prevent unwanted births, it is not a solution chosen by all pet owners.

Breeding factories, such as "puppy mills", which tend to assembly-line breeding, typically prevent unwanted and mixed breeding by inhibiting the animal's ability to co-exist and move about freely with other animals. Rather, these breeding animals are housed in very small, cramped, make-shift cages where the animal has little space to move about. Such a living condition is not only an inhumane life of confinement, it also is very unhealthy for the animal. The animal does not have the opportunity to run, jump or play, or receive any extended type of exercise, thereby resulting in a great deal of mental stress which in turn, produces less healthy offspring.

Another means in controlling the unwanted pet population is by using birth control for the female pet, such as by regular veterinarian visits for prescriptions to prevent ovulation and shots and injections which abort the regency. However, such birth control means can be costly over time. Many pet owners choose a more physical type of birth control device which prevents the female animal from engaging in intercourse while in heat, such as the use of sanitary garments and anti-breeding devices which prevents access to an animal's generative organs.

Anti-breeding devices in the form of harness having a type of protective member have been used in the prior art as another method of controlling unwanted pets. For example, U.S. Pat. No. 2,974,635 to McDowell, issued Mar. 14, 1961, provides an anti-breeding device having a body harness, a shield and protector, the shield and protector being attached to the harness and conforming to the rear end of a dog's body. U.S. Pat. No. 3,107,653 to Goddard Jr., issued Oct. 22, 1963, discloses a device for the prevention of conception in a female animal comprising a collar or belt which has a rearwardly protruding object attached thereto to prevent mating with a male animal. U.S. Pat. No. 3,176,657 to Callaway, issued Apr. 6, 1965, discloses an animal harness having a protective shield depending therefrom which covers the generative organs of an animal.

These anti-breeding devices, along with garments and similar devices which are designed to cover and "protect" the generative organs of an animal, have significant drawbacks. First, most these devices encompass the entire anal and vaginal area of the animal. Such an arrangement enables the animal's stool to contact the vaginal area. This problem is compounded when the animal urinates within the confined area of the device, which can create unsanitary conditions for the animal, serious rashes and irritation of the vaginal area, as well as posing other health risks to the animal, particular infections to the vaginal area. A second disadvantage to these devices is that bowel problems, such as impaction, can occur because an animal may not defecate when stool is pressed against the anal opening and trapped within the device. Inadequate ventilation in such garments and devices creates a suitable environment for the incubation of internal parasites.

The removal of such devices from the animal must occur in a timely manner once an "unsanitary condition" has occurred in order to reduce the risk to the animal's health. However, such removal and cleaning of such devices also poses health risks to the individual due to the harmful bacterial parasites that may reside within the animals fecal matter. There are a number of zoonosis diseases (diseases that can be transmitted from animal to human) which can be transmitted by domestic pets, including for example, anthrax, Blastomycosis, Bergeyella (weeksella) zoohelcum, *Brucella canis*, rabies, campylobacteriosis, *Capnocytophaga canimorsus, Capnocytophaga cynodegmi*, CDC groups NO-1, CDC groups EF-4a and EF-4b, cheyletiellosis, coenurosis, Cryptosporidiosis, cutaneous larva migrans, demodex folliculorum, dermatophytosis, *Dipylidium caninum*, echinococcosis, *Francisella tularensis, Gasyrospirillum hominis*, granulocytic ehrlichiosis, leptospirosis, lyme disease, *Neisseria canis, Neisseria weaveri*, Pasteurella multocida, plague, Rocky Mountain spotted fever, salmonellosis, Scabies, *Staphylococcus intermedius, Strongyloides stercoralis, trichinosis*, visceral larva migrans and *Yersinia enterocolitica*.

The prior art is replete with halters and harnesses for use on domestic animals for restraining and/or controlling purposes. Such harnesses are provided in a variety of designs ranging from simple neck collars to more elaborate configurations having a plurality of loops, buckles and fitted vest-like straps. While the more elaborate designs have overcome some of the disadvantages of the simpler designs, they also present new drawbacks. One of the more significant drawbacks is that the more elaborate designs are harder to adjust, particularly for persons with arthritis, the blind or members of our society with prosthetics. As a result, the numerous halters and harnesses which having loops, snaps and/or buckles or which use sliding techniques for adjustment, do not allow the physically challenged a suitable means of adjusting their pets' harness to fit properly. The harness designs that have been provided with simplified adjustment means, typically lack the versatility of fitting and adjusting on animals of different shapes and sizes.

Despite the teachings of the prior art, a need still exists for a device to prevent unwanted pregnancy among domestic animals without eliminating the ability of the animal to breed at a desired time. Such a device should allow the animal to run, jump, play and exercise and co-exist with other animals of both sexes. Such a device should also provide easy cleaning and maintenance without the fear of contamination.

SUMMARY OF THE INVENTION

Accordingly, it is an object of the present invention to provide an adjustable harness and animal birth control device that will prevent unwanted impregnation of female quadrupeds.

It also is an object of the present invention to provide an adjustable harness and animal birth control device which will reduce the unwanted pet population.

It is an additional object of the present invention to provide an adjustable harness and animal birth control device that will prevent mating of a female quadruped when the animal is in heat.

It is another object of the present invention to provide pet owners with a tangible form of voluntary prevention of impregnation without permanent sterilization by means of an adjustable harness and animal birth control device.

It is yet another object of the present invention to provide an adjustable harness and animal birth control device which will enable male and female animals to co-exist when the female is in heat without the risk of impregnation.

It is a further object of the present invention to provide an adjustable harness and animal birth control device which will protect an animal from pregnancy while permitting freedom of movement for the animal, such as walking, running, jumping and sitting.

It is still another object of the present invention to provide an adjustable harness and animal birth control device which will confine the vaginal area of an animal while permitting the animal to perform normal body functions such as urination and defecation.

It is an additional another object of the present invention to provide an adjustable harness and animal birth control device which will prevent penetration by stray animals along with the spread of infectious "zoonotic" diseases while the domestic pet is in heat.

It is a further object of the present invention to provide an adjustable harness and animal birth control device for female quadrupeds that will not allow the animal stool to contact the vaginal area while in use.

It is another object of the present invention to provide an adjustable harness and animal birth control device which provides adequate ventilation to the vaginal area of the female animal while in use, thereby deterring the growth and incubation of internal parasites and preventing lingering unpleasant odors.

It is yet another object of the present invention to provide an adjustable harness and animal birth control device which is adapted with a compartment enabling the easy insertion and removal of a disposable sanitary napkin while the animal is in heat.

It is also an object of the present invention to provide an adjustable harness and animal birth control device that will prevent female domestic pets in heat from "spotting" while they are indoors, riding in vehicles and in public places.

It is another object of the present invention to provide an adjustable harness and animal birth control device for domestic animals that can be simply and easily fastened and unfastened to and from the animal's body.

It is still another object of the present invention to provide an adjustable harness and animal birth control device that can be easily fitted and adjusted to the specific size of the animal while in use.

It is yet another object of the present invention to provide an adjustable harness and animal birth control device that is easy and convenient to use by individuals with limited physical ability, such as those afflicted by physical conditions such as arthritis, those who use prosthetics and those who are blind so that they can properly fit and adjust the harness and birth control device onto their pet without assistance from others.

It is a further object of the present invention to provide an adjustable harness and animal birth control device which can be unfastened from the animal easily without having to contact animal excrement and which can be cleaned easily and maintained in a sanitary condition.

It is still a further object of the present invention to provide an adjustable harness and animal birth control device to pet owners and mass breeding facilities which will allow pet guardians with a humane and responsible means of breeding animals.

It is yet another object of the present invention to provide an adjustable harness and animal birth control device for domestic animals which is characterized by it's simplicity, is economic in construction, operation, and manufacturing.

Additional objects, advantages and novel features of the invention will be set forth in part of the description which follows, and in part will become apparent to those skilled in the art upon examination of the following specification or may be learned by practice of the invention.

BRIEF DESCRIPTION OF THE DRAWINGS

The present invention will be better understood with reference to the appended drawing sheets, wherein:

FIG. 3 is a side perspective view of the waist collar and hind straps of the animal harness of the present invention.

FIGS. 3A and 3B illustrate in close-up the snapping arrangement on the waist collar of the present invention.

FIGS. 3C and 3D illustrate the buckle arrangement on the waist collar of the present invention.

FIG. 5 is an exploded side perspective view of the central hind strap of the present invention.

FIGS. 5A and 5B illustrate in close-up the locking system of the central hind strap.

FIG. 6 is an exploded side perspective view of the birth control device of the present invention.

DETAILED DESCRIPTION

Figure 1:
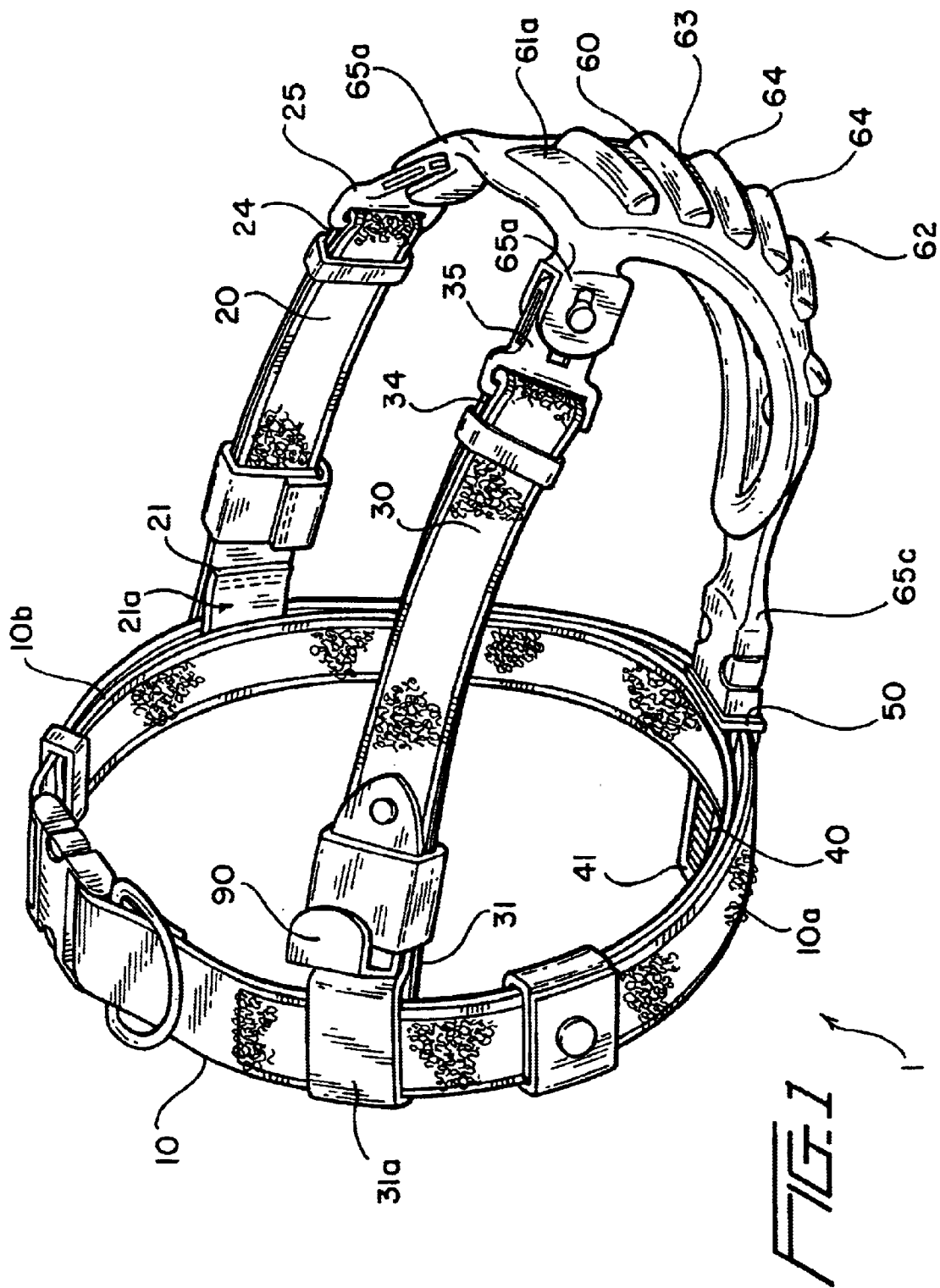
FIG. 1 is a side perspective view of the animal harness and birth control device of the present invention.
Figure 2:
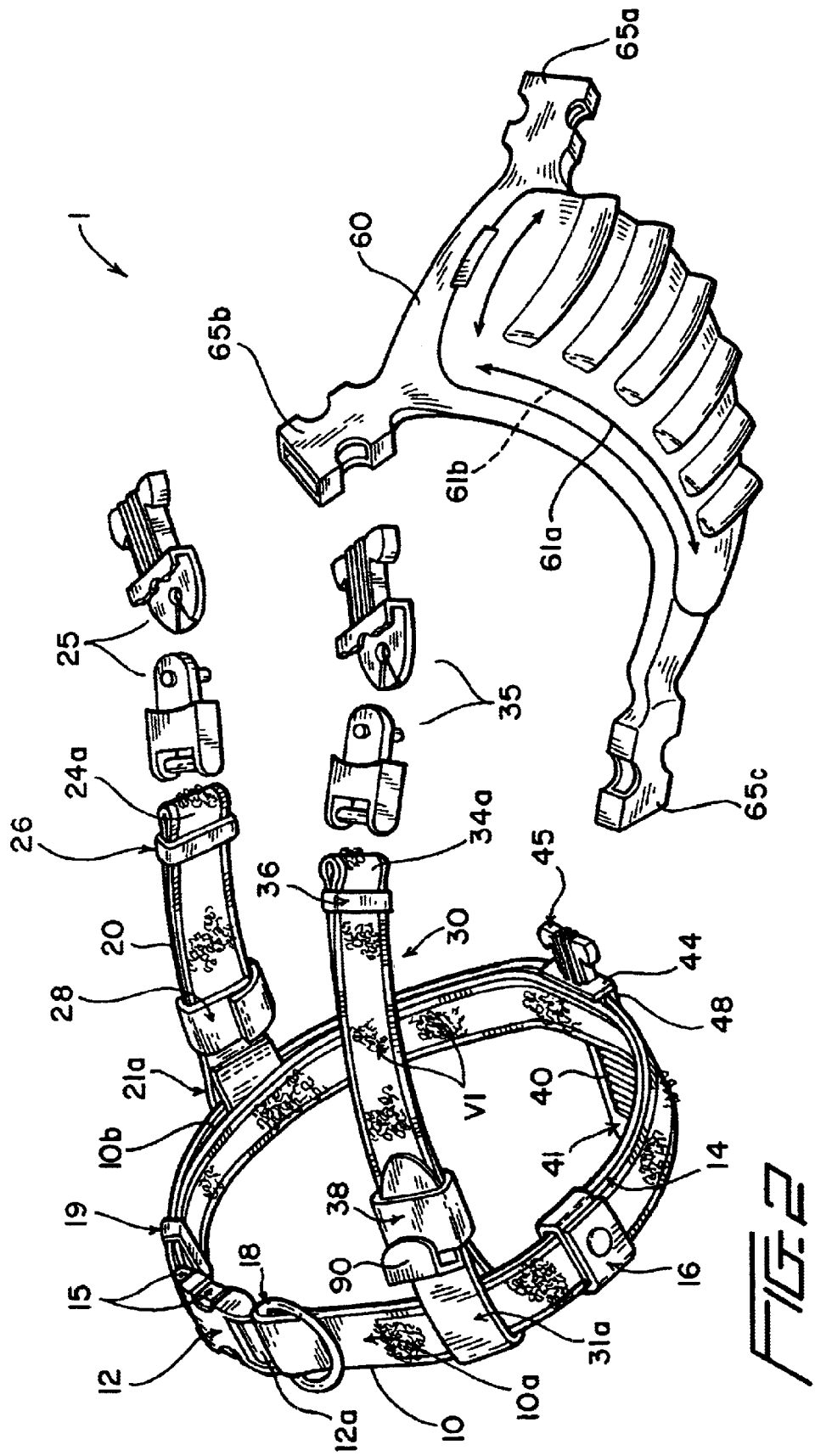
FIG. 2 is an exploded side perspective view of the animal harness and animal birth control device of the present invention.

As shown in FIGS. 1 and 2, the present invention relates to an adjustable animal harness and birth control device 1 broadly comprising a waist collar 10, a right hind quarter harness strap 20 (hereinafter referred to as the "right harness strap"), a left hind quarter harness strap 30 (hereinafter referred to as the "left harness strap"), a central strap member 40 and a birth control device 60. The right harness strap 20 comprises a first looped end 21a which engages waist collar 10, thereby removably securing the right strap to the waist collar, and a second end 24 which is fastened to a coupling means 25. Similarly, the left harness strap 30 comprises a first looped end 31a which engages waist collar 10, thereby removably securing the left strap to the waist collar, and a second end 34 which is fastened to a coupling means 35. The central strap member 40 is adjustably and detachably connected to the waist collar 10 by means of an adjusting ring 50 and is provided with a coupling means 45 at one end. As described in greater detail below, the coupling means 25, 35 and 45 of the right and left straps 20 and 30 and the central strap member 40 are designed to engage three corresponding coupling means 65a, 65b and 65c provided on the birth control device 60, thereby securing the birth control device to the adjustable harness.

The waist collar 10 is designed to fit around the waist of an animal and can be composed of any type of conventional webbing, including for example, a belted webbing. Referring in particular to FIGS. 3, 3A, 3B, 3C and 3D, the waist collar 10 is in the form of an elongated web having an outer surface 10a, an undersurface 10b, a first end 11, a first looped end 11a to which a first fastening element 12 is secured, a second end 14, and a second looped end 14a to which a second fastening element 15 is secured. The outer surface 10a and the undersurface 10b are provided with mating hook and loop type fasteners, such as Velcro™. Preferably, the outer surface 10a is provided with loop fastening means V1 and selected portions of the undersurface 10b are provided with hook fastening means V2. The first and second fastening elements 12 and 15 are configured to engage one another in such a manner that the first looped end 11a can be detachably secured to the second looped end 14a. Preferably, the first and second fastening elements are in the form of buckling elements. More preferably, first fastening element 12 is a female buckling element having a post member 12a and second fastening element 15 is a male buckling element having a post member 15a.

To construct the elongated web into the waist collar, first end 11 is looped about post member 12a of the female buckle element 12 and is secured, for example by stitching, to the undersurface 10b, thereby forming first looped end 11a. In a preferred embodiment, the first end is introduced through a D-ring 18 prior to being looped about post member 12a. The second end 14 of the waist collar is introduced through looped end 31a, adjusting ring 50, looped end 21a and a rectangular ring 19 and is then looped about post member 15a of the male buckle element 15, thereby forming second looped end 14a. The second end 14 thereafter is passed back through rectangular ring 19 and over the adjusting ring 50 and is secured to the undersurface 10b of the elongated webbing. The second end 14 can be secured to the undersurface 10b by any suitable means, for example by stitching. In the embodiment shown in FIGS. 3, 3A and 3B, the second end 14 is attached to a first securing strap member 16 by suitable means, for example by stitching. First securing strap member 16 has a first fastening end 16a and a second fastening end 16b. In the embodiment shown, the first and second fastening ends 16a and 16b are a snap/fit arrangement, with first fastening end 16a being a male snap element and second fastening end 16b being a female snap element. The strap member 16 is looped about the waist collar in such a manner that the first fastening end 16a engages the second fastening end 16b, thereby detachably securing the horizontal strap 16 to the waist collar 10.

Figure 4A:
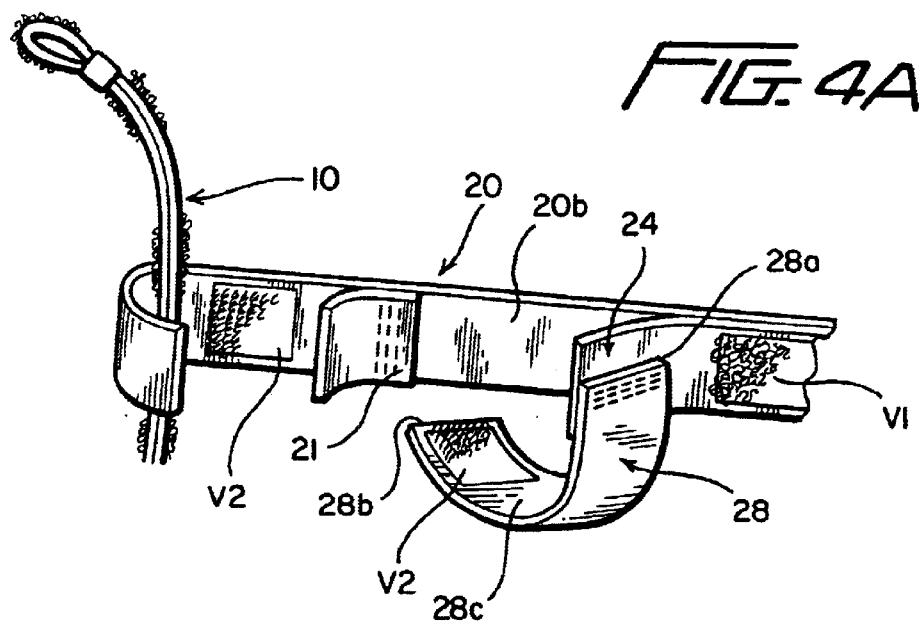
FIG. 4A is an exploded side perspective view of the coupling arrangement of the hind straps of the animal harness of the present invention.
Figure 4B:
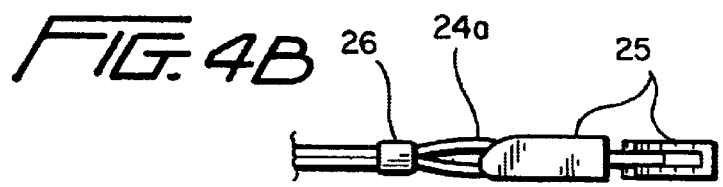
FIGS. 4B, 4C and 4D are side views illustrating the second looped end of the hind strap with a coupling means of the present invention.
Figure 4C:
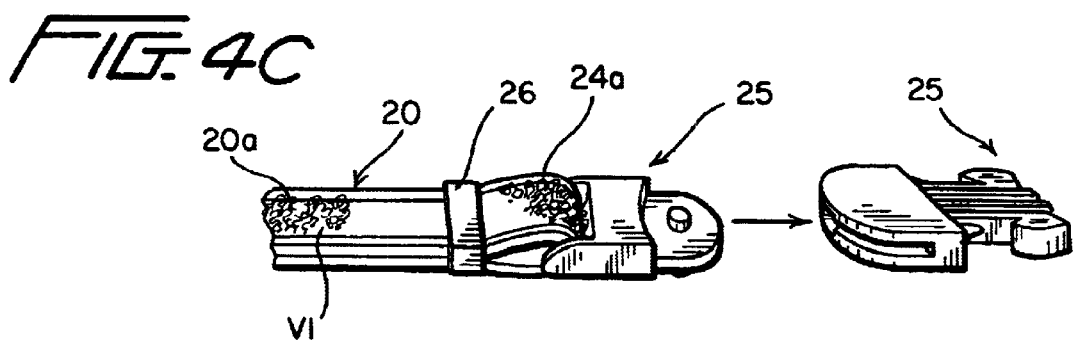
Figure 4D:
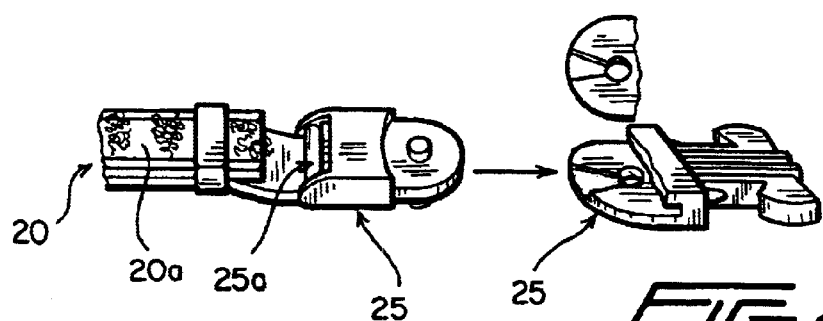
Figure 7:
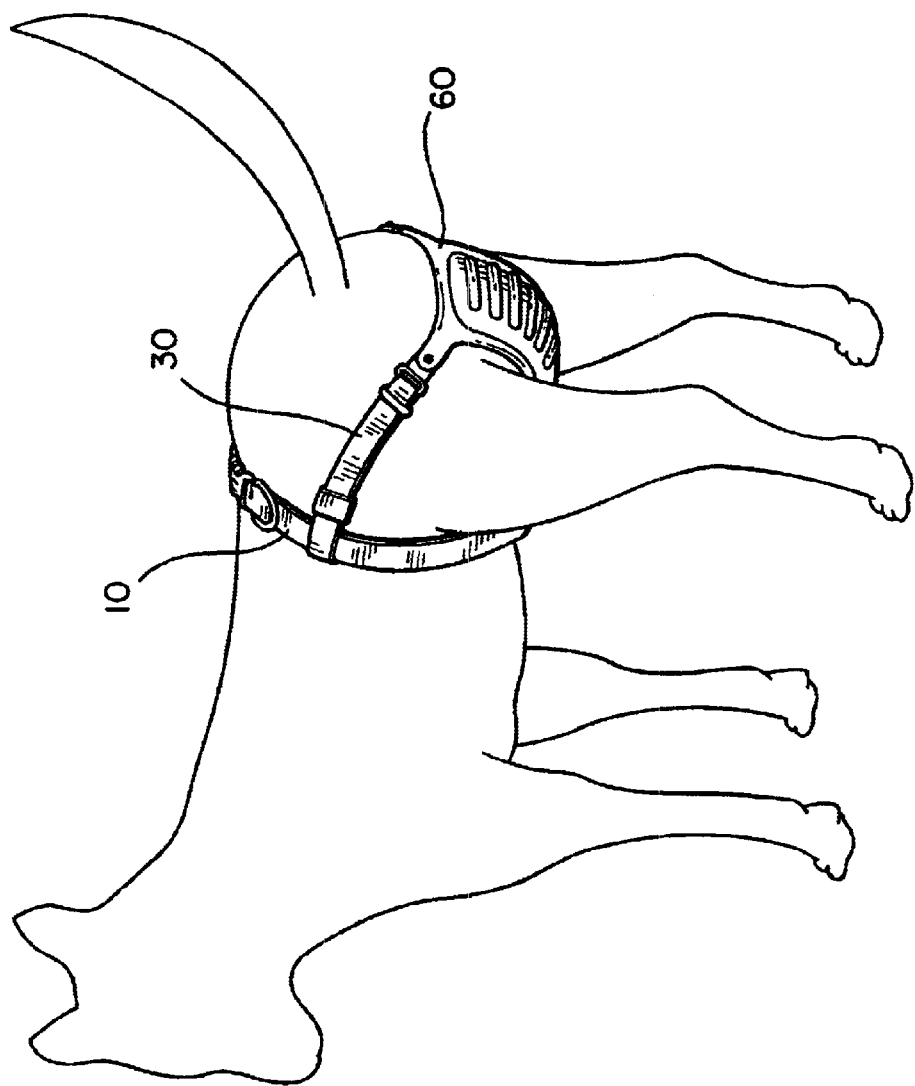
FIG. 7 is a side view of the animal harness and birth control device of the present invention fitted to an animal.

FIGS. 3, 4A, 4B and 4C illustrate the construction of the right and left harness straps to the waist collar. Since the construction of each harness strap is identical, only the construction of the right harness strap will be discussed. However, it is to be understood that the left harness strap is constructed in an analogous manner. Referring now to FIGS. 3, 4A and 4B, the right harness strap 20 comprises a first end 21, a first looped end 21a, a second end 24, a second looped end 24a, an outer surface 20a and an undersurface 20b, the outer surface 20a being provided with loop fastening means. Preferably, the outer surface 20a is provided with Velcro™ loop fastening means V1 as described above in reference to the waist collar 10. The right harness strap 20 is constructed by looping first end 21 around the waist collar and securing, such as by stitching, the first end to undersurface 20b, thereby forming a first looped end 21a. The undersurface 20b of the first looped end 21a is provided with Velcro™ hook fastening means V2. In this manner, the looped end 21a can be detachably and adjustably secured to the outer surface 10a of the waist collar 10 by the interaction of the loop fastening means V1 disposed along the outer surface 10a of the waist collar and the hook fastening means V2 disposed on the undersurface 20b of the first looped end 21a.

The second end 24 of the right harness strap 20 is introduced through rectangular ring 26 and is looped about post member 25a of coupling means 25, thereby forming the second looped end 24a. The second end 24 thereafter is passed back through rectangular ring 26 and upwards toward the first looped end 21a. A short second securing strap member 28 having a first end 28a and a second end 28b is secured, such as by stitching, to the second end 24. Preferably, each end of the strap member 28 is secured to the center of the second end 24 of the right harness strap 20. The first end 28a of the strap member 28 is looped over and around the right harness strap 20 and secured to the second end 28b, such as by stitching, such that a loop is formed. A portion of the undersurface 28c of the strap member is provided with hook fastening means V2 which contacts and engages the loop fastening means V1 disposed along the outer surface 20a of the right harness strap 20, thereby detachably and adjustably securing the second end 24 of the right harness strap 20.

A key member 90, shown in FIGS. 1, 2 and 3, can be used to facilitate the unlocking of the loop and hook fastening means V1 and V2. As shown in FIGS. 1 and 2, the key member 90 is of an L-shape configuration, the longer leg sliding between the loops V1 and hooks V2, thereby separating the loop and hook fastening means from one another and allowing the harness strap to slide easily for adjustment. Once the harness strap has been properly adjusted, the key member is removed the hook and loop fasteners are pressed together, thereby securing the harness strap.

The central harness strap 40 is illustrated in FIGS. 5, 5A and 5B. The central harness strap 40 is in the form of a flexible and extendable member 41 having an undersurface 41a, an upper surface 41b a first end 42a, a second end 42b and a mid-portion 42c and may be composed of any flexible material, preferably a plastic material. The undersurface 41a is provided with a locking mechanism 43. In a preferred embodiment, the locking arrangement is a series of slanted slots 44 which are biased in a first direction, for example toward first end 42a as shown in FIGS. 5 and 5B. The second end 42b of the central harness strap 40 is provided with a coupling means 45, such as a buckling member.

The central harness strap 40 is adjustably and detachably secured to the waist collar by means of an adjusting ring 50 through which the waist collar 10 is passed, as described above. Referring to FIG. 5, the adjusting ring 50 comprises four (4) L-shaped slotted corner flanges 51a, 51b, 51c and 51d, depending from the under surface 50a of the adjusting ring. These slotted corner flanges are configured in such a manner that they receive the first end 42a of the central harness strap 40 and hold the undersurface 41a of central harness strap against the undersurface of 50a of the adjusting ring 50. The undersurface 50a of the adjusting ring is provided with a locking mechanism 52 and a release means 53. The locking mechanism 52 is designed to interact with the locking mechanism 43 provided on the undersurface of the central harness strap in such a manner that the central harness strap 40 can be introduced into the adjusting ring 50 through the slotted corner flanges in a first direction, but cannot be removed from the adjusting ring in a second opposite direction without actuating release means 53. In a preferred embodiment, as shown in FIG. 5, the locking mechanism 52 is in the form of slanted slots 54 which are biased in the direction opposite the direction of the slanted slots 44 of the central harness strap 40. Any suitable release means 53 can be used which will disengage the two interacting locking mechanisms. In a preferred embodiment, the release means comprises two opposing release buttons 56a and 56b, disposed on opposite sides of the adjusting ring 50. In operation, the central harness strap is guided through the adjusting ring 50 until the strap is properly fitted, the two interacting locking mechanisms effectively preventing further movement of the central strap within the adjusting ring, thereby detachably and adjustably securing the central harness strap 40 to the waist collar 10. To detach the central harness strap, the two release buttons are pressed, thereby releasing the locking arrangement and allowing the central harness strap to be removed from the adjusting ring. The undersurface 50a of the adjusting ring 50 also may be provided with one or more tension release slots 58a and 58b disposed on other side of the locking mechanism 52 and between the locking mechanism and release means 53. A tension release slot 59 also may be disposed on the undersurface 50a beneath each of the corner flanges 51a, 51b, 51c and 51d. The tension release slots in combination with release buttons 56a and 56b assist in the adjustment and removal of the central harness strap 40.

The birth control device 60, generally shown in FIGS. 1 and 2, comprises a generally convex outer surface 61a, a corresponding concave inner surface 61b, a right coupling means 65a, a left coupling means 65b and a central coupling means 65c. The birth control device is detachably secured to the harness by joining right coupling means 65a to coupling right harness strap coupling means 25, left coupling means 65b to coupling left harness strap coupling means 35 and central coupling means 65c to central harness strap coupling means 45. Preferably, the strap coupling means 25, 35, and 45 are in the form of male fastening members and the birth control device coupling means 65a, 65b and 65c are in the form of corresponding female fastening members.

The concavity of the birth control device 60 is configured to lie over and shield the vaginal area of an animal. The central portion 62 of the outer surface 61a of the birth control device is provided with a series of openings 63 which provide ventilation to the vaginal area and allow urine to be passed therethrough. The series of openings can be of any suitable shape, including for example, circular, oval, square, tear drop, triangle, diamond, rectangular, slotted horizontally, slotted vertically, slotted diagonally, or mesh. Preferably, the central portion 62 is provided with a series of downwardly tapered louvers 64 having the openings 63 disposed therein. In this manner, urine is guided through the louvered openings in a more efficient manner.

Although the birth control device can be of a one-piece construction, an alternate embodiment is contemplated as shown in FIG. 6, wherein the birth control device comprises a frame member 70 having a top end 71a, a bottom end 71b and a removable compartment 72. The frame member 70 is provided with three coupling means 75a, 75b and 75c corresponding and operating in like fashion to the coupling means of the birth control device 60. The frame member further is provided with a catch slot 78 at the top end 71a and a locking slot 79 at the bottom end 71b. Compartment 72 comprises a top end 72a and a bottom end 72b, and a series of openings 73 disposed thereon, preferably louvered openings 74 as described above. The compartment further comprises a release tab 76 at the top end 72a which is configured to engage catch slot 78 and a hook tab 77 at the bottom end 72b which is configured to engage locking slot 79. The tab and slot arrangements allow the compartment 72 to be inserted easily and secured within the frame member 70 and to be removed easily for cleaning. The compartment 72 is capable of receiving and retaining a sanitary pad 80 having pull tab 81.

The waist collar, the harness straps and the securing strap members can be composed of any type of flexible webbing material. Suitable webbing materials, include for example, leather, flexible plastic materials, vinyl webbing materials, elastic webbing straps, cloth belted webbing, nylon webbing, and rope style webbing. In addition, the webbing material may be of any suitable width and thickness or may be rounded. A wide variety of fastening means and coupling means can be used to join the two ends of the waist collar and the left and right harness straps to the birth control device. Suitable fastening and coupling means include, for example, Velcro™ fasteners, snap fit arrangments, clamps, buckles with top release buttons or side release buttons, chain link buckles with screw fasteners, clasps, hooks and loops, clips, nut and bolt arrangements and the like. The key member can be composed of various materials including for example, plastics, metals, fiberglass and wood materials.

While particular embodiments of the invention have been described, it will be understood, of course, that the invention is not limited thereto, and that many obvious modifications and variations can be made, and that such modifications and variations are intended to fall within the scope of the appended claims.

What is claimed is:

1. An adjustable harness and animal birth control device comprising:
   (1) an adjustable harness comprising:
      (a) a waist collar having a first end, a first looped end, a second end, a second looped end, an outer surface and an undersurface, said first looped end having a first fastening means and said second looped end having a second fastening means adapted to engage said first fastening means in such a manner that said first looped end can be detachably secured to said second looped end, thereby detachably securing said first end to said second end;
      (b) a right harness strap having an outer surface, an undersurface, a first end, a first looped end which engages and is adjustably secured to said waist collar, a second end, and a second looped end having a first coupling member attached thereto;
      (c) a left harness strap having an outer surface, an undersurface, a first end, a first looped end which engages and is adjustably secured to said waist collar, a second end, and a second looped end having a second coupling member attached thereto;
      (d) a central harness member having an outer surface, an undersurface, a first end and a second end having a third coupling member attached thereto, said central harness member being adjustably and detachably secured to said waist collar by means of an adjusting ring, and
   (2) a birth control device having an outer surface, a first complementary coupling member adapted to engage said first coupling member of said right harness strap, a second complementary coupling member adapted to engage said second coupling member of said left harness strap and a third complementary coupling member adapted to engage said third coupling member of said central harness member in such a manner that said birth control device can be detachably secured to said adjustable harness.

2. The adjustable harness and animal birth control device in accordance with claim 1, wherein said waist collar is in the form of an elongated web and wherein said outer surface of said waist collar is provided with loop fastening material.

3. The adjustable harness and animal birth control device in accordance with claim 1, wherein a first buckling element having a post member is attached to said first looped end of said waist collar and a second buckling element having a post member is attached to said second looped end of said waist collar, said first buckling element being capable of engaging said second buckling element in such a manner that said first looped end is adjustably and detachably secured to said second looped end.

4. The adjustable harness and animal birth control device in accordance with 3, wherein said waist collar is constructed by passing said first end of said waist collar about said post member of said first buckling element and then securing said first end of said waist collar to said undersurface of said waist collar, thereby forming said first looped end of said waist collar, passing said second end of said waist collar through said first looped end of said left harness strap, through said adjusting ring, through said first looped end of said right harness strap, through a rectangular ring disposed around said waist collar and about said post member of said second buckling element, thereby forming said second looped end of said waist collar, passing said second end of said waist collar back through said rectangular ring, over said adjusting ring and securing said second end of said waist collar to said waist collar.

5. The adjustable harness and animal birth control device in accordance with claim 4, further comprising a first strap member secured to said second end of said waist collar, said first strap member having a first fastening end and a second fastening end, wherein, said first strap member is looped about said waist collar in such a manner that said first fastening end engages and detachably secures to said second fastening end, thereby detachably securing said second end of said waist collar to said waist collar.

6. The adjustable harness and animal birth control device in accordance with claim 2, wherein the outer surface of each of said right harness strap and left harness strap is provided with a loop fastening material.

7. The adjustable harness and animal birth control device in accordance with claim 6, wherein said right harness strap is constructed by looping said first end of said right harness strap around said waist collar and securing said first end of said right harness strap to the undersurface thereof, thereby forming said first looped end of said right harness strap, passing said second end of said right harness strap through a rectangular ring and looping about said first coupling member, thereby forming said second looped end of said right harness strap, passing said second end of said right harness strap back through said rectangular ring and to a securing point disposed on said right harness strap and detachably securing said second end of said right harness strap to said securing point of said right harness strap.

8. The adjustable harness and animal birth control device in accordance with claim 7, wherein said undersurface of said first looped end of said right harness strap is provided with a hook fastening material adapted to engage said loop fastening material disposed on said outer surface of said waist collar, thereby adjustably securing said first looped end of said right harness strap to said waist collar.

9. The adjustable harness and animal birth control device in accordance with claim 7, further comprising a second strap member having a first end and a second end, said second strap member being looped about said second end of said right harness strap in such a manner that both said first end and said second end of said second strap member are secured to said second end of said right harness strap, said second strap member having an undersurface provided with a hook fastening material adapted to engage said loop fastening material disposed on said outer surface of said right harness strap, thereby adjustably securing said second end of said right harness strap to said securing point on said right harness strap.

10. The adjustable harness and animal birth control device in accordance with claim 6, wherein said left harness strap is constructed by looping said first end of said left harness strap around said waist collar and securing said first end of said left harness strap to the undersurface thereof, thereby forming said first looped end of said left harness strap, passing said second end of said left harness strap through a rectangular ring and looping about said second coupling member, thereby forming said second looped end of said left harness strap, passing said second end of said left harness strap back through said rectangular ring and to a securing point disposed on said left harness strap and detachably securing said second end of said left harness strap to said securing point of said left harness strap.

11. The adjustable harness and animal birth control device in accordance with claim 7, wherein said undersurface of said first looped end of said left harness strap is provided with a hook fastening material adapted to engage said loop fastening material disposed on said outer surface of said waist collar, thereby adjustably securing said first looped end of said left harness strap to said waist collar.

12. The adjustable harness and animal birth control device in accordance with claim 10, further comprising a third strap member having a first end and a second end, said third strap member being looped about said second end of said left harness strap in such a manner that both said first end and said second end of said third strap member are secured to said second end of said left harness strap, said third strap member having an undersurface provided with a hook fastening material adapted to engage said loop fastening material disposed on said outer surface of said left harness strap, thereby adjustably securing said second end of said left harness strap to said securing point of said left harness strap.

13. The adjustable harness and animal birth control device in accordance with claim 1, wherein said central harness member comprises a flexible and extendable member having an undersurface, a upper surface, a first end, a second end and a mid-portion, said undersurface of said central strap member being provided with a first locking mechanism.

14. The adjustable harness and animal birth control device in accordance with claim 13, wherein said adjusting ring comprises an undersurface having a second locking mechanism capable of engaging said first locking mechanism, slidingly retaining means to retain said extendable member of said central harness member to said adjusting ring and means to release said first locking mechanism from said second locking mechanism.

15. The adjustable harness and animal birth control device in accordance with claim 14, wherein said means to slidingly retain said extendable member is in the form of four L-shaped corner flanges disposed upon said undersurface of said adjusting ring.

16. The adjustable harness and animal birth control device in accordance with claim 14, wherein when said first end of said extendable member is introduced in a first direction within said slidingly retaining means, said first locking mechanism slidingly contacts and engages said second locking mechanism in said first direction in order to adjustably and detachably secure said central harness member to said waist collar, said first locking mechanism being designed such that it cannot slidingly engage said second locking mechanism in a second direction which is opposite that of said first direction.

17. The adjustable harness and animal birth control device in accordance with claim 16, wherein said first locking mechanism is in the form of a series of slanted slots biased in a first direction and said second locking mechanism is in the form of a series of slanted slots biased in a direction opposite of the direction of said slanted slots disposed on said first locking mechanism.

18. The adjustable harness and animal birth control device in accordance with claim 1, wherein said birth control device further comprises a central portion having a plurality of openings therethrough.

19. The adjustable harness and animal birth control device in accordance with claim 18, further comprising a central portion having a series of downwardly tapered louvers, each of said louvers having an opening.

20. The adjustable harness and animal birth control device in accordance with claim 1, wherein said birth control device comprises a frame member having said first, second and third complementary coupling members and a compartment member, said frame member being provided with means to detachably secure said compartment member within said frame member.

21. The adjustable harness and animal birth control device in accordance with claim 20, said frame member further comprising a top end having a catch slot and a bottom end having a locking slot, said compartment member comprising a top end having a release tab which detachably engages said catch slot and a bottom end having a hook tab which detachably engages said locking slot.

22. The adjustable harness and animal birth control device in accordance with claim 1, wherein said adjustable harness is fitted to an animal in such a manner that said birth control device is disposed under the anal opening of an animal.

23. The adjustable harness and animal birth control device in accordance with claim 9, further comprising a key member having an elongated leg which slides between said hook fastening material and loop fastening material in order to facilitate adjustment of said right harness strap.

24. The adjustable harness and animal birth control device in accordance with claim 12, further comprising a key member having an elongated leg which slides between said hook fastening material and loop fastening material in order to facilitate adjustment of said left harness strap.

* * * * *